United States Patent [19]
Hsie

[11] Patent Number: 5,114,532
[45] Date of Patent: May 19, 1992

[54] PROCESS OF ETCHING IRON-SILICON-ALUMINUM TRIALLOYS AND ETCHANT SOLUTIONS USED THEREFOR

[75] Inventor: Wei C. Hsie, Eden Prairie, Minn.

[73] Assignee: Seagate Technology, Inc., Scotts Valley, Calif.

[21] Appl. No.: 674,071

[22] Filed: Mar. 21, 1991

[51] Int. Cl.$^5$ .............................. B44C 1/22; C23F 1/00
[52] U.S. Cl. .................................... 156/665; 156/664; 156/662; 752/79.3
[58] Field of Search ............... 156/656, 664, 662, 666, 156/665; 252/79.2, 79.3, 142; 134/3

[56] References Cited

U.S. PATENT DOCUMENTS

| | | | |
|---|---|---|---|
| 2,711,364 | 6/1955 | Beach | 41/42 |
| 2,719,781 | 10/1955 | Hesch | 41/42 |
| 3,106,499 | 10/1963 | Kendall | 156/665 |
| 3,107,188 | 10/1963 | Hancock | 156/17 |
| 3,607,480 | 9/1971 | Harrap | 156/17 |
| 4,454,014 | 6/1984 | Bischoff | 204/129 |
| 4,614,607 | 9/1986 | Loch | 252/142 |
| 4,875,970 | 10/1989 | Takeya et al. | 156/645 |

*Primary Examiner*—William A. Powell
*Attorney, Agent, or Firm*—Kinney & Lange

[57] ABSTRACT

An etchant for etching iron-silicon-aluminum trialloys comprises a one liter aqueous solution of ammonium bifluoride and nitric acid in the range of about 0.03 to 0.1 Moles of ammonium bifluoride and 3.5 to 10 Moles of nitric acid with the remainder being water. The etch is applied directly to the iron-silicon-aluminum trially at room temperature in an isotropic and isothermal process.

15 Claims, No Drawings

PROCESS OF ETCHING IRON-SILICON-ALUMINUM TRIALLOYS AND ETCHANT SOLUTIONS USED THEREFOR

BACKGROUND OF THE INVENTION

This invention relates to etching magnetic materials, and particularly to etching iron-silicon-aluminum trialloys.

Magnetic materials are employed in a variety of applications, particularly in the electronic arts. It is common, for example, to employ thin films of magnetic materials in magnetic transducers for reading and writing digital data on media, the patterns of the thin films being at least partially defined through etching processes. For example, magnetic nickel-iron alloys such as Permalloy are commonly etched with ferric chloride ($FeCl_3$); magnetic crystals of manganese-zinc-ferrite are etched with phosphoric acid ($H_3PO_4$). However, no chemical etchant is known for selected etching of iron-silicon-aluminum trialloys.

Sendust is a particularly useful magnetic iron-silicon-aluminum trialloy used in the electronic arts containing about 83 weight percent iron or more and exhibiting a higher saturation magnetization than ferrite. Typical compositions of Sendust contain between about 83 wt % and 94 wt % iron, 4 wt % and 11 wt % silicon and 2 wt % and 6 wt % aluminum. However, there is no known chemical etchant useful for selectively etching patterns in thin films of iron-silicon-aluminum alloys. Consequently, when employing such alloys in electronic devices, such as in magnetic heads, it has been necessary to carefully control the deposition of the of the magnetic alloy through masks and the like. If etching was required, it had to be accomplished through a physical etch, such as an ion milling or sputter etch.

Nitric acid is a well-known etchant for iron. It is theorized that iron-silicon-aluminum alloys have not been successfully chemically etched with nitric acid prior to the present invention because nitric acid causes oxides of silicon and aluminum to thicken and adhere better over the ferrite-silicon-aluminum alloy, thereby inhibiting further etching of the alloy.

SUMMARY OF THE INVENTION

The present invention provides a process for etching iron-silicon-aluminum trialloys, such as Sendust, and an etchant for etching iron-silicon-aluminum trialloys.

In accordance with the present invention, an etchant comprises an aqueous solution comprising low concentrations of fluoride ions and nitric acid. Preferably, one liter of the solution contains between approximately 0.03 and 0.1 Moles of ammonium bifluoride and 3.5 and 10.0 Moles of nitric acid, with the remainder of the solution being water. The etching process is accomplished by applying the above solution to iron-silicon-aluminum at room temperature to achieve etching rates of between about 150 and 800 Angstroms/second.

DETAILED DESCRIPTION OF THE PREFERRED EMBODIMENTS

The presently preferred solution of the present invention can be conveniently prepared by mixing ten grams of ammonium bifluoride with 750 milliliters of 70% nitric acid and 2000 milliliters of distilled water. The resultant mixture contains about 0.064 Moles of ammonium bifluoride and 6.1 Moles of nitric acid with the remainder of a one liter solution being water. When the foregoing solution was applied to a thin layer of iron-silicon-aluminum of Sendust having a composition between 83 and 85 wt % iron, 9.5 and 11 wt % silicon and 5.5 and 6 wt % aluminum at room temperature (between 18 and 20° C.), an etch rate of 335 Angstroms per second was observed with an undercut of less than 1 micron and an etch profile which was smooth at an angle of about 5.7 degrees. The process was isotropic so that etching occurred at approximately equal rates in directions both normal to the thickness and parallel to the thickness of the material. The process is also isothermal so that less than 2° C. temperature change occurred during the etching process.

In another test, thin film pads of aluminum oxide were deposited and selectively etched to a thickness of about 2500 Angstroms onto a thin film layer of the above described iron-silicon-aluminum alloy (Sendust). The entire structure was coated with a positive photoresist such as AZ4330 or SP1370 which was exposed and developed to form a mask having portions masking the aluminum oxide pads and exposing the iron-silicon-aluminum alloy. The above-described etchant comprising 0.064 Moles of ammonium bifluoride and 6.1 Moles of nitric acid with the remainder of a one liter solution being water was applied to the exposed surfaces. The iron-silicon-aluminum trialloy was etched at a rate of about 335 Angstroms per second, whereas no noticeable undercut occurred to the aluminum oxide pads.

The following table sets forth the Mole concentrations of nitric acid and ammonium bifluoride in one liter of aqueous solution for etching Sendust iron-silicon-aluminum trialloys at room temperature in accordance with the present invention, together with the observed etching rates. The etching rates will be higher (faster etches) at higher temperatures.

TABLE 1

| Concentration (Moles) | | Etch Rate |
|---|---|---|
| $HNO_3$ | $NH_4F(HF)$ | (A/Sec) |
| 3.53 | 0.037 | 170–180 |
| 6.1 | 0.064 | 335 |
| 7.46 | 0.078 | 457 |
| 9.59 | 0.10 | 800 |

From the foregoing table it can be observed that it is preferred to employ an aqueous solution containing between approximately 0.03 and 0.1 Moles ammonium bifluoride, 3.5 and 10.0 Moles nitric acid, with the remainder of a one liter solution being water. It is also evident from the foregoing table that the Molar concentration of nitric acid is between about 95 and 96 times that of ammonium bifluoride. Clearly, these same proportions can be employed outside the preferred ranges described above to accomplish desired etching of iron-silicon-aluminum trialloys, but at a sacrifice of excessive time (in the case of weaker solutions) or of control of the etching process (in the case of more concentrated solutions).

While other sources of fluoride ions may be employed, such as hydrofluoric acid and/or aluminum fluoride, I have found that etching rates and ion concentrations are difficult to control and deleterious results may occur using such sources of fluoride ions. Hydrofluoric acid, for example, will attack aluminum oxide, rendering hydrofluoric acid an unsuitable source of fluoride ions where aluminum oxide is used with the trialloy (such as pads on a magnetic head member).

Further, the etch processes using solutions of nitric acid and hydrofluoric acid are not isotropic, resulting in undesirable pitting of the iron-silicon-aluminum trialloy. Although I have not experimented with aluminum fluoride as a source of fluoride ions with nitric acid, I expect any aluminum deposited out of the aluminum fluoride during the deposition process would have an adverse effect on the trialloy, perhaps altering its magnetic characteristics. Further, I expect aluminum fluoride as a source of fluoride ions would render the etching process difficult to control, due to its low solubility in aqueous solutions and its low dissociation constant. Consequently, I prefer to use ammonium bifluoride as the source of fluoride ions for control of the etching process.

Thus, there has been described an improved etchant and process for chemically etching iron-silicon-aluminum trialloys.

Although the present invention has been described with a certain degree of particularity, various modifications to the proportions of the specific reagents may occur to workers skilled in the art without departing from the spirit and scope of the invention.

What is claimed is:

1. A process for etching an iron-silicon-aluminum trialloy which comprises the step of applying to said trialloy an aqueous solution of nitric acid and a source of fluoride ions.

2. The process according to claim 1 wherein said source of fluoride ions is ammonium bifluoride.

3. The process according to claim 2 wherein the Molar concentration of nitric acid is between about 95 and 96 times that of ammonium bifluoride.

4. The process according to claim 2 wherein one liter of said solution corresponds to the Mole ratio within the range of from 0.03 to 1.0 moles of ammonium bifluoride and 3.5 to 10.0 Moles of nitric acid.

5. The process according to claim 1 wherein said solution is applied at room temperature.

6. The process according to claim 2 wherein said solution is applied at room temperature.

7. The process according to claim 3 wherein said solution is applied at room temperature.

8. The process according to claim 4 wherein said solution is applied at room temperature.

9. The process according to claim 8 wherein said iron-silicon-aluminum alloy comprises a magnetic alloy containing at least about 83 wt % iron and between about 4 wt % and 11 wt % silicon and 2 wt % and 6 wt % aluminum.

10. The process according to claim 1 wherein said iron-silicon-aluminum alloy comprises a magnetic alloy containing at least about 83 wt % iron and between about 4 wt % and 11 wt % silicon and 2 wt % and 6 wt % aluminum.

11. The process according to claim 2 wherein said iron-silicon-aluminum alloy comprises a magnetic alloy containing at least about 83 wt % iron and between about 4 wt % and 11 wt % silicon and 2 wt % and 6 wt % aluminum.

12. The process according to claim 3 wherein said iron-silicon-aluminum alloy comprises a magnetic alloy containing at least about 83 wt % iron and between about 4 wt % and 11 wt % silicon and 2 wt % and 6 wt % aluminum.

13. The process according to claim 4 wherein said iron-silicon-aluminum alloy comprises a magnetic alloy containing at least about 83 wt % iron and between about 4 wt % and 11 wt % silicon and 2 wt % and 6 wt % aluminum.

14. An etchant for etching magnetic iron-silicon-aluminum trialloys comprising at least about 83% iron and between about 4 wt % and 11 wt % silicon and 2 wt % and 6 wt % aluminum consisting of an aqueous solution of nitric acid and ammonium bifluoride wherein the Molar concentration of nitric acid is between about 95 and 96 times that of ammonium bifluoride.

15. An etchant for etching magnetic iron-silicon-aluminum trialloys comprising at least about 83% iron and between about 4 wt % and 11 wt % silicon and 2 wt % and 6 wt % aluminum consisting of an aqueous solution of nitric acid and ammonium bifluoride wherein one liter of said solution corresponds to the Mole ratio within the range of from 0.03 to 1.0 Moles of ammonium bifluoride and 3.5 to 10.0 Moles of nitric acid.

* * * * *